Jan. 5, 1971     W. C. WEHNER     3,551,990
BEARING ASSEMBLY AND METHOD OF ELIMINATING BEARING SQUEAKS
IN AN ELASTOMERIC BEARING ASSEMBLY
Original Filed Jan. 26, 1967     2 Sheets-Sheet 1

INVENTOR
WILLIAM C. WEHNER
BY
*Burton & Parker*
ATTORNEYS

INVENTOR
WILLIAM C. WEHNER
BY

*Burton & Parker*

ATTORNEYS

United States Patent Office 3,551,990
Patented Jan. 5, 1971

3,551,990
**BEARING ASSEMBLY AND METHOD OF ELIMI-
NATING BEARING SQUEAKS IN AN ELAS-
TOMERIC BEARING ASSEMBLY**
William C. Wehner, Detroit, Mich., assignor to Moog
Industries, Inc., St. Louis, Mo., a corporation of
Missouri
Substituted for abandoned application Ser. No. 611,925,
Jan. 26, 1967. This application May 9, 1969, Ser. No.
839,756
Int. Cl. B23p 7/00
U.S. Cl. 29—401                                    10 Claims

ABSTRACT OF THE DISCLOSURE

In general, this disclosure relates to the elimination of squeaks in a bearing assembly having an elastomeric bushing compressed between metal sleeves, in which a wedged insert is forced between one of the sleeves and the bushing further compressing the bushing, to compensate for deterioration of the elastomer.

---

This application is a substitute application of my U.S. patent application Ser. No. 611,925, filed Jan. 26, 1967, now abandoned.

An example of the environment in which the bearing assembly and method of this invention is particularly suitable, is the bearing assembly of a suspension arm, or A arm of a motor vehicle, and the invention will therefore be described in this context.

The bifurcated end of an automotive suspension arm is pivotally supported on the car frame by a "pivot" or support shaft, which is bolted to the frame. The ends of the support shaft are received through apertures provided in the bifurcated ends of the suspension arm, and bearings are located between the ends of the shaft and the suspension arm. A conventional bearing assembly comprises a collar which is secured within apertures provided in the suspension arm, a co-axial bearing sleeve secured to the shaft adjacent the ends, and an annular elastomeric bushing which is received under compression between the collar and the bearing sleeve. The bearing assembly is typically retained on the shaft by a washer, and a nut threadably received on the shaft end.

The elastomeric bushing, which is generally rubber, or synthetic rubber, is subjected to high eccentric loading and deterioration in the automotive environment. Grease, air, temperature changes and foreign matter combine to deteriorate the rubber, and hysteresis effects decrease its resiliency. Further, even a new bushing may slip within the collar to cause bearing squeak. The bearing "squeaks" when the elastomeric bushing slips; where the resiliency of the compressed elastomeric material is no longer sufficient to prevent slippage between the bushing and the collar or the sleeve. The metal rubs against the rubber, which creates an annoying squeaking sound.

Presently, this situation is remedied by replacement of the bearing assemblies, which is an expensive and time consuming process. The conventional method includes placing the suspension arm in an arbor press to remove the support shaft, which requires complete removal of the suspension arm from the automotive suspension system. This requires taking off the wheel, restraining or removing the coil spring, disconnecting the ball joint secured to the opposite end of the suspension arm, and removing the bolts between the support shaft and the frame. The support shaft must next be removed from the suspension arm, which is accomplished by the use of an arbor press, or the like, with a spacer between the ends of the suspension arm to prevent its collapse. Finally, the bearings may be removed, and the system reassembled. After assembly, the wheel alignment should be checked, and adjusted.

It is an object of the present invention to provide an improved bearing assembly which can be adjusted in situ to eliminate bearing squeaks.

Another object of this invention is to provide a method of eliminating bearing squeaks in conventional bearing assemblies having an elastomeric bushing, without removing or replacing the bearings.

A further object of this invention is to provide a method of compensating for deterioration of an elastomeric bushing in bearing assembly, quickly, and inexpensively, without the requirement of special tools.

Another object of the present invention, is to provide a support shaft replacement kit for an automotive suspension arm, which can be adjusted incrementally to compensate for deterioration of the elastomeric bushing, without removing the support shaft or the bushings.

Briefly, the improved bearing assembly of this invention comprises a split bearing sleeve received on the shaft, a collar telescopically received over the sleeve, and an elastomeric bushing disposed under compression between the collar and the sleeve. A sleeve insert is wedgingly received between the shaft and the split bearing sleeve, expanding the split sleeve, and compressing the elastomeric bushing against the collar to compensate for deterioration of the elastomeric bushing. The sleeve insert is urged into wedging relation by a threaded nut, or the like, such as presently used to retain conventional bushings. The leading edge of the insert sleeve may be tapered from the axis of the sleeve, and the sleeve may be split to permit the sleeve to expand over a shoulder, or the like, defined on the support shaft. A dished retainer may be provided between the nut and the bushing to partially enclose the end of the bushing, and prevent axial expansion of the elastomeric bushing under the wedging action of the insert.

The replacement kit of this invention comprises a support shaft for an automotive suspension arm having a bearing assembly, similar to the assembly described hereinabove, disposed on either end. A plurality of spacers are disposed between the threaded member and the bushing limiting the penetration of the insert, and providing controlled incremental movement of the insert into wedging relation; on removal of a predetermined number of the spacers, and tightening the nut against the retainer, or the insert.

The method of eliminating bearing squeaks in the above described bearing assembly includes removing the threaded nut and the washer from the end of the support shaft, disposing the described sleeve insert over the end of the shaft, and urging the insert into wedging engagement between the support shaft and the split bearing sleeve, which may be accomplished with the threaded nut.

Other objects, advantages, and meritorious features of this invention will more fully appear from the following specification, claims, and accompanying drawings, wherein:

Figure 1:
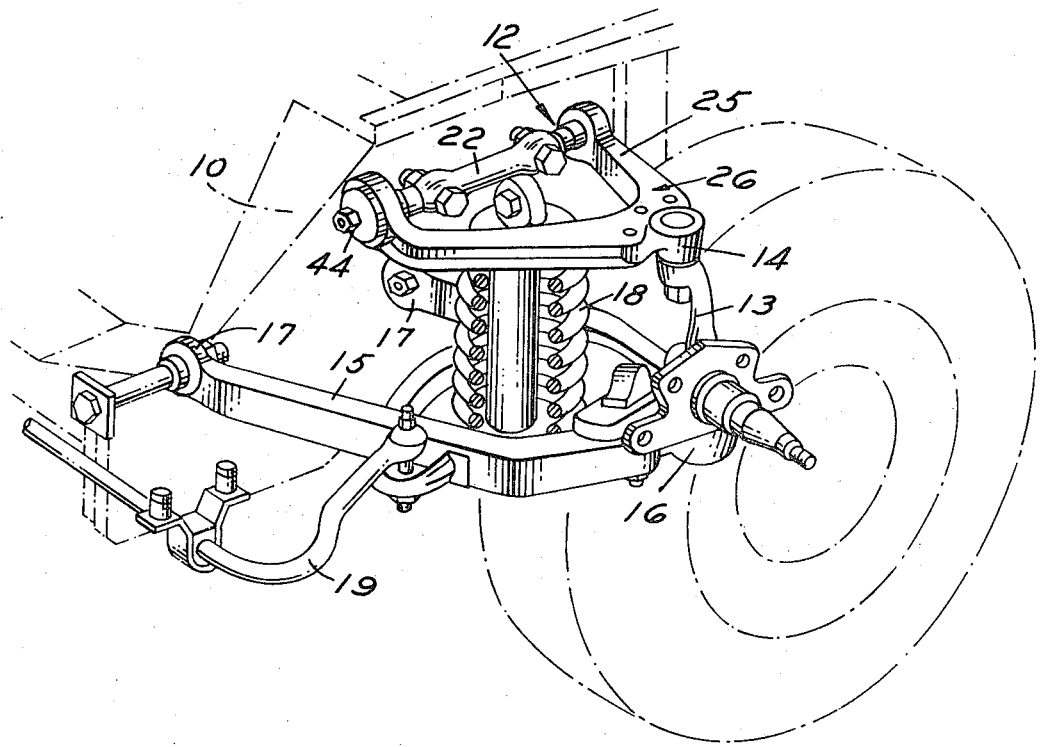
FIG. 1 is a partially cross sectioned view of the bearing assembly of this invention in an automotive environment.
Figure 2:
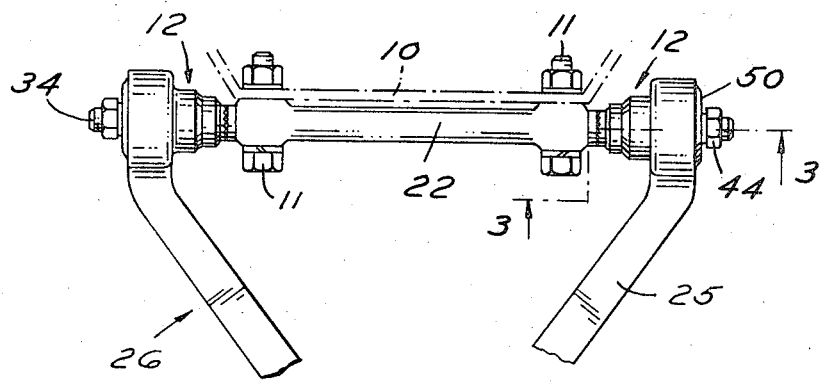
FIG. 2 is a top view of the upper suspension arm and support shaft shown in FIG. 1.

FIGS. 1 and 2 illustrate the automotive embodiment in which the bearing assembly and method of this invention may be utilized. As described hereinabove, the upper automotive suspension arm 26 is pivotally supported on the car frame 10 by the support shaft 22. The shaft is bolted to the frame by bolts 11, and the ends of the shaft 34 are received through apertures provided in the bifurcated ends 25 of the suspension arm.

Mearing assemblies 12 which are the subject matter of this invention, are provided between the support shaft 22 and the suspension arm 26 to serve both as a bearing support, and as a sound attenuation means between the suspension system and the frame. It can be seen from FIG. 1, that the suspension arm bearing assemblies are are subjected to considerable eccentric torsional loading, which results in the hysteresis effects described hereinabove. The bearing assembly is retained on the threaded end 34 of the shaft by a retainer 50, and a nut 44.

The opposite end of the suspension arm 26 is pivotally supported on the wheel spindle 13 by the upper ball joint 14. The lower suspension arm 15 is similarly pivotally connected to the wheel spindle 13 by the lower ball joint 16, and secured to the frame of opposite ends 17. FIG. 1 also shows the coil spring 18, and the stabilizer bar 19.

Figure 3:
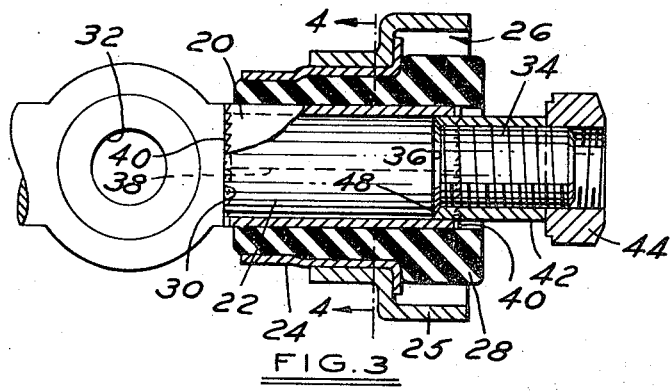
FIG. 3 is a cross sectional view of an embodiment of the bearing assembly of this invention of FIG. 2, in the direction of view arrows 3—3.
Figure 4:
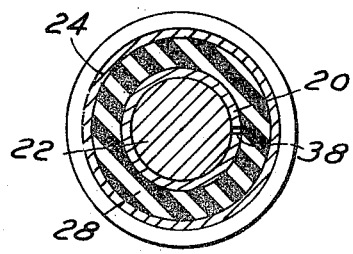
FIG. 4 is an end cross sectional view of FIG. 3, in the direction of view arrows 4—4.

FIGS. 3 and 4 illustrate the embodiment of the bearing assembly of this invention shown in FIGS. 1 and 2. A split bearing sleeve 20 is received on the support shaft 22, a collar 24 is secured in an aperture defined in a leg 25 of the suspension arm 26, and an elastomeric bushing 28 is disposed under compression between the collar 24 and the sleeve 20. The support shaft 22, in this embodiment, is conventional in automotive suspension systems, and is provided with a shoulder 30 to prevent relative axial movement of the bearing sleeve, an aperture 32 for bolting the shaft to the automotive frame as shown in FIGS. 1 and 2, and a threaded end 34 to receive a retaining means for the bearing assembly. The threaded end 34 of the shaft defines a second shoulder 36.

The bearing sleeve is split at 38 along its axis, and the ends are provided with teeth 40, at either end, to render the bearing sleeve operably integral with the shaft 22. The collar 24 is secured against rotation in the suspension arm, so that it pivots without slippage with the suspension arm 26. As described hereinabove, the automotive suspension arm has a bifurcated end, which is pivotally supported on the car frame by the support or stationery pivot shaft 22. FIG. 3 illustrates one leg 25 of the automotive suspension arm 26 and the associated bearing assembly, and the opposed end of the support shaft 22 in FIGS. 1 and 2 is similarly supported on a bearing assembly in the opposite leg of the suspension arm.

The elastomeric bushing 28 is compressed between the collar and the sleeve to prevent relative movement between the interface of the bushing and the metal sleeve 20, or the collar 24. Relative pivotal motion between the suspension arm 26, and the support shaft 22, theoretically causes laminar flow in the annular elastomeric bushing, with a maximum movement in the neutral axis of the bushing, decreasing to zero at the interfaces. However, this ideal theoretical condition is achieved only while the elastomer retains sufficient resiliency to prevent slippage at the metal to elastomer interfaces. When the elastomer deteriorates, slippage occurs, causing a squeaking sound, which is the rubbing of the metal surfaces against the rubber bushing.

The conventional practice used to alleviate this situation is to replace the bearing assembly, however this is a time consuming and costly operation, as described hereinabove. The bearing assembly and method of this invention is adapted to compensate for deterioration of the elastomeric bushing, and eliminate bearing squeaks, without requiring removal of the bearing assembly from the suspension arm.

The sleeve insert 42, received over the threaded end of the support shaft 34, is urged into wedging relation between the split bearing sleeve 20 and the shaft 22 by the threaded nut 44. In this embodiment, the sleeve insert is split along its axis, at 46 (see FIG. 6), and the leading edge 48 is tapered, from the axis of the insert, to permit the insert to expand over the shoulder 36 defined on the support shaft.

Figure 5:
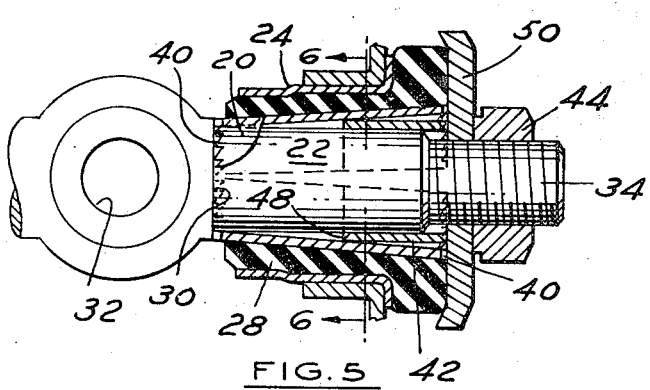
FIG. 5 is an embodiment of the assembly similar to FIG. 3, after the sleeve insert has been fully received in wedging relation.
Figure 6:
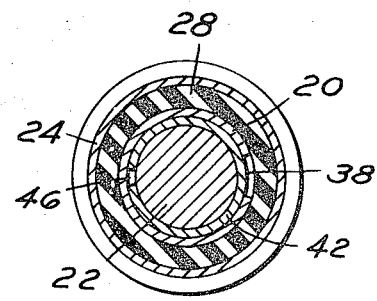
FIG. 6 is an end cross sectional view of FIG. 5 in the direction of view arrows 6—6.

The result of the wedging action of the insert 20 can best be described in relation to the embodiment of the bearing assembly shown in FIGS. 5 and 6; which is identical to the embodiment described, except that an improved retainer 50 has been utilized. It can be seen from FIG. 5 that the insert 42 expands the split bearing sleeve 20, and further compresses the elastomeric bushing 28 between the sleeve and the collar 24, without disturbing the operable engagement between the sleeve and the shaft 22. The teeth 40 of the sleeve continue to grip the shoulder 30 of the shaft at one end, and the retainer 50 at the other end, to maintain the integral engagement described hereinabove.

The compression of the elastomeric bushing 28, by the insert 42, re-establishes the laminar flow in the elastomeric bushing described hereinabove, by eliminating slippage between the interfaces of the elastomer and the bearing sleeve, and the collar. The insert thus compensates for deterioration of the elastomer by utilizing its remaining resiliency, and eliminates bearing squeaks without removal or replacement of the bushing assembly.

The retainer 50 prevents axial expansion of the elastomeric bushing during compression by the insert 42, and prevents rotation of the bearing sleeve 20 relative to the support shaft 22. The retainer is dished toward the elastomeric bushing to prevent the retainer from buckling under the force of the nut 44, and to help contain the bushing.

The method of eliminating squeaks in an automotive suspension arm bearing assembly, already installed in the suspension system, comprises; removing the nut threaded on the support shaft 22 and the washer, disposing an insert over threaded end of the shaft 34, and threading a nut on the shaft end to urge the insert into the wedging relation described hereinabove. Where the retainer 50 is to be utilized, the method includes disposing the retainer over the end of the shaft before threading the nut on the shaft.

Figure 7:
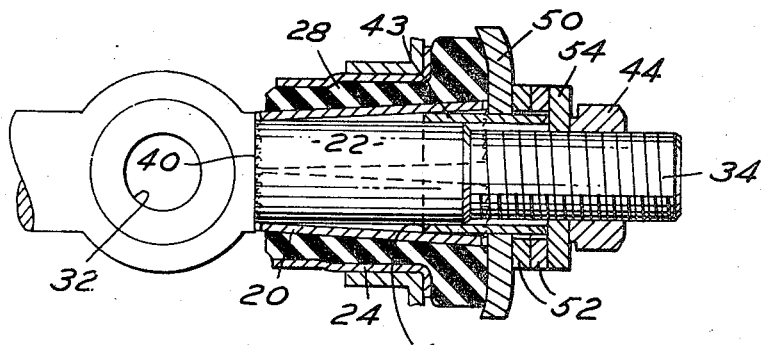
FIG. 7 is a partial cross sectional view of the support shaft replacement kit embodiment of this invention.

FIG. 7 illustrates a support and bearing assembly replacement kit, which may be adjusted in situ to compensate for deterioration of the elastomeric bushing 28, and eliminate bearing squeak without requiring the service mechanic to stock elements of the improved bearing assembly. Further, the improved bearing kit permits incremental adjustment of the insert 43, in this embodiment. Many of the elements of the bearing assembly are identical to those described, and therefore are numbered accordingly.

A plurality of spacers or shims 52 have been provided between the retainer 50 and the nut 44 to limit penetration of the insert 43. Sufficient spacers may initially be provided to prevent any penetration of the insert, similar to FIG. 1. Removal of the spacers, and threading of the nut 44, provides controlled incremental movement of the insert into wedging relation between the split sleeve 20 and the shaft 22. A washer 54 has been provided between the nut 44 and the spacers 52 to engage the insert 43. The bearing assembly kit may be utilized to adjust compression of the elastomeric bushing, as required, to compensate for deterioration of the elastomer. The insert has also been tapered at both ends to permit insertion of either end.

Figure 8:
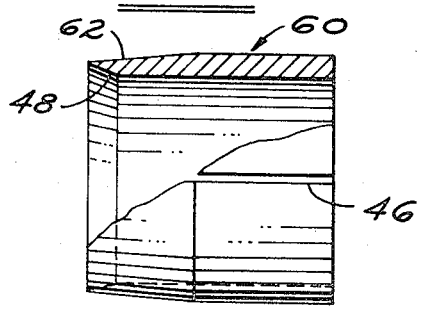
FIG. 8 is a partial cross sectional view of another embodiment of the sleeve insert.

In the embodiment of the insert 60 shown in FIG. 8, the outer surface of the leading edge 62 is tapered toward the axis of the insert to prevent buckling or columning of the insert during insertion of the insert in the bearing assembly. This modification is preferred where the radial distance between the split bearing sleeve and the collar (20 and 24 in FIGS. 1 and 2) is insufficient to permit the bearing sleeve to expand without buckling the single tapered insert of FIGS. 3 to 7. In this embodiment, the outer surface 62 has been tapered five degrees from the axis, and the inner edge has been tapered at an angle of fifteen degrees.

It will be understood by those skilled in the art that several modifications may be made to the embodiments of the bearing assembly disclosed, and the method of this invention, without departing from the purview of the appended claims. For example, the support shaft may be modified by threading a bolt, or the like, into the end of the shaft to retain the bearing assembly, and urge the insert into wedging relation, rather than the nut 44 disclosed. The spacers 52 may also be utilized in the embodiments shown in FIGS. 3 and 5 to permit incremental adjustment of the wedging insert.

What is claimed is:

1. A bearing assembly, including a shaft having a split bearing sleeve received thereon, a collar telescopically received over said sleeve, an elastomeric bushing disposed under compression between said collar and said sleeve, said collar adapted to support a member in pivotal relation to said shaft, a sleeve insert wedgingly received between said shaft and said split bearing sleeve expanding said split sleeve and compressing said elastomeric bushing against said collar to compensate for deterioration of said elastomeric bushing, and a threaded member received on said shaft urging said insert into said wedging relation.

2. The bearing assembly defined in claim 1, characterized in that said assembly includes a plurality of spacers received over said shaft between said threaded member and said bushing limiting the penetration of said insert and providing controlled incremental movement of said insert into said wedging relation on removal of a predetermined number of said spacers and tightening of said threaded member.

3. The bearing assembly defined in claim 1, characterized in that the inside leading edge of said sleeve insert is tapered from the axis of said sleeve, and said insert is split to permit the insert to expand over a shoulder defined on said shaft.

4. The bearing assembly defined in claim 3, characterized in that the outer leading edge of said sleeve insert is tapered toward the axis of said insert.

5. The bearing assembly defined in claim 1, characterized in that said assembly includes a retainer disposed between said threaded member and said elastomeric bushing adapted to restrain the axial expansion of said bushing during compression by said insert.

6. The bearing assembly defined in claim 5, characterized in that said retainer is dished toward said elastomeric bushing to enclose the end portion of said bushing.

7. An automotive suspension arm support shaft replacement kit for eliminating bearing squeaks after assembly, comprising: a suspension arm support shaft having a bearing assembly received on each end, said bearing assembly including a collar adapted to be received in an aperture defined in the suspension arm, a split bearing sleeve telescopically received within said collar received on said shaft adjacent its ends, an elastomeric bushing disposed under compression between said sleeve and said collar, a sleeve insert disposed over the ends of said shaft adapted to be wedgingly urged between said split bearing sleeve and said shaft to expand said sleeve and compress said elastomeric bushing to compensate for deterioration of said bushing and eliminate bearing squeaks, a member threadably received on the ends of said shaft operably engaging said sleeve insert to urge said insert into said wedging relation, and a plurality of spacers disposed between said member and said bushing limiting the penetration of said insert and providing controlled incremental movement of said insert into said wedging relation on removal of a predetermined number of said spacers and threaded tightening of said member.

8. The invention defined in claim 7, characterized in that the leading edge of said sleeve is tapered from the axis of said sleeve, and said sleeve is split to permit the sleeve to expand over a shoulder defined on said support shaft.

9. A method of eliminating bearing squeaks in the bearing assembly of an automotive suspension arm having a collar received in the suspension arm, a split bearing sleeve received on the support shaft within the collar, and an elastomeric bushing disposed under compression between the collar and the bearing sleeve, said method comprising: removing the threaded member retaining the bearing assembly on the support shaft, disposing a sleeve insert over the end of the shaft, and urging the sleeve insert into wedging engagement between the support shaft and the split bearing sleeve to expand the sleeve and compress the elastomeric bushing to compensate for deterioration of said bushing and eliminate the bearing squeaks.

10. The method defined in claim 9, characterized in that said insert is urged into said wedging relation by threadably tightening said member against said insert.

References Cited

UNITED STATES PATENTS

| | | | |
|---|---|---|---|
| 1,992,631 | 2/1935 | Piquerez | 287—85 |
| 2,346,574 | 4/1944 | Guy | 285—85 |
| 2,993,715 | 7/1961 | Hutton | 287—85 |

DAVID J. WILLIAMOWSKY, Primary Examiner

A. V. KUNDRAT, Assistant Examiner

U.S. Cl. X.R.

29—149.5; 280—96.2; 287—85